(12) United States Patent
Homan et al.

(10) Patent No.: US 10,036,827 B2
(45) Date of Patent: Jul. 31, 2018

(54) PETROPHYSICALLY-CONSISTENT CALIBRATION OF FULL-TENSOR ELECTROMAGNETIC INDUCTION TOOLS

(71) Applicant: Schlumberger Technology Corporation, Sugar Land, TX (US)

(72) Inventors: Dean Homan, Sugar Land, TX (US);
Siddharth Misra, Austin, TX (US);
John Rasmus, Richmond, TX (US);
Gerald N. Minerbo, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 183 days.

(21) Appl. No.: 14/944,288

(22) Filed: Nov. 18, 2015

(65) Prior Publication Data
US 2016/0139231 A1 May 19, 2016

Related U.S. Application Data

(60) Provisional application No. 62/081,263, filed on Nov. 18, 2014.

(51) Int. Cl.
*G01R 35/00* (2006.01)
*G01V 3/28* (2006.01)
*G01V 13/00* (2006.01)

(52) U.S. Cl.
CPC ............... *G01V 3/28* (2013.01); *G01V 13/00* (2013.01)

(58) Field of Classification Search
None
See application file for complete search history.

(56) References Cited

U.S. PATENT DOCUMENTS

| | | | |
|---|---|---|---|
| 4,876,511 A | 10/1989 | Clark | |
| 5,293,128 A | 3/1994 | Zhou | |
| 6,690,170 B2 | 2/2004 | Homan et al. | |
| 7,414,391 B2 | 8/2008 | Homan et al. | |
| 7,733,093 B2 * | 6/2010 | Homan | G01V 3/28 324/339 |
| 2010/0180662 A1 * | 7/2010 | Radtke | G01V 13/00 73/1.01 |
| 2012/0081122 A1 * | 4/2012 | Frey | G01V 3/28 324/339 |
| 2015/0177412 A1 * | 6/2015 | San Martin | G01V 3/38 702/7 |

(Continued)

OTHER PUBLICATIONS

U.S. Appl. No. 14/827,632, filed Aug. 17, 2015.

*Primary Examiner* — Jermele M Hollington
*Assistant Examiner* — Douglas X Rodriguez (57) ABSTRACT

A method for calibrating an electromagnetic core analysis tool is disclosed. The method includes disposing a tilted test loop inside of or outside of a tool having more than one antenna. A uniform test pack, a layered test pack, and an effective media test pack are each disposed in the tool. A signal is induced in a receiver antenna in the tool when a second antenna is energized with a known current of a known frequency. The induced signal is measured and a calibration gain and offset is determined. A corrected signal is produced and compared with the determined signal based on a forward model.

13 Claims, 6 Drawing Sheets

(56) References Cited

U.S. PATENT DOCUMENTS

2016/0003963 A1* 1/2016 Kouchmeshky ......... G01V 3/38
  702/7
2016/0170068 A1* 6/2016 Donderici .............. G01V 13/00
  324/339

* cited by examiner

PETROPHYSICALLY-CONSISTENT CALIBRATION OF FULL-TENSOR ELECTROMAGNETIC INDUCTION TOOLS

CROSS-REFERENCE TO RELATED APPLICATION

This application claims benefit of U.S. Provisional Patent Application Ser. No. 62/081,263, filed Nov. 18, 2014, which is herein incorporated by reference.

FIELD

This invention relates to the test and calibration of a full-tensor electromagnetic (EM) tools for the purposes of core analysis and/or flow-line measurements in laboratory, at the well-site, or at subsurface locations.

BACKGROUND

Use of full-tensor dielectric and conductivity measurements on whole core samples, core plugs, and flow-line measurements are increasingly being utilized in the estimation of directional resistivities, anisotropy ratios, fluid saturations, bed boundaries, dips, and other resistivity parameters in geological samples.

Full-Tensor Complex Conductivity EM Tool for Core Analysis

Core analysis is one the ways of evaluating oil-wells. Geological cores are obtained as whole cores or side-wall cores. The assessment of formation characteristics acquired from geological cores is crucial to the decision-making process concerning development plans for petroleum wells that are being evaluated for an exploration or production activity. Full-tensor complex conductivity measurements on geological cores provide valuable directional information about the resistivity properties of the formations, reduces uncertainty in resistivity interpretation from well logs, is non-invasive and non-contact method for resistivity measurements unlike galvanic methods, generates continuous as-received resistivity logs of whole cores, and is the most-suitable core-based resistivity measurement for geologically-complex anisotropic and heterogeneous reservoirs.

In one full-tensor inductive conductivity tool for flow-line measurements and whole core analysis, an alternating current driven through transmitter induces eddy currents in the surrounding volume, which further induce a complex voltage in the receiver coil. Induced voltage is measured using electronics (for example, lock-in amplifiers, etc.) with high signal-to-noise ratio. Moreover, the direct coupling between the transmitter and receiver coils is removed using a bucking coil, which exploits additive nature of the induced voltage responses. The coil configuration in the tool is designed to generate three-dimensional orthogonal magnetic dipoles using one axial coil and two saddle coil arrangement for each of the transmitter, receiver, and buck coils. Such an orthogonal system is capable of measuring tensor inductive conductivity of the formation. Basic 1D-inversion of this conductivity tensor measurement gives horizontal resistivity, anisotropy ratio, dip, and azimuth of the volume of investigation. Also, an emerging technique is to incorporate tilted antennas. In order to use such tools for commercial core analysis application, a standardized petrophysically-consistent calibration technique needs to be developed.

Calibration Techniques for Downhole EM Logging Tools

Tool calibration is an important and necessary task of logging operations. Factors such as imperfection in tool construction and variations due to the tool's electronics can introduce errors in measurements. Methods are available for calibrating EM logging tools to remove such errors in tools having radially outward-looking antennas of a downhole EM tool. These methods use electronic circuits/devices for calibration purposes that are not representative of the petrophysical properties of geological samples.

SUMMARY

This disclosure addresses the need for calibrating radially inward-looking antennas of TMD-type EM core analyses tools. Also, in order to improve existing circuit- and device-based calibration schemes, we propose new petrophysically-consistent calibration techniques and ICM for full-tensor electrical measurements.

A method for calibrating an electromagnetic core analysis tool is disclosed. The method includes disposing a tilted test loop inside of or outside of a tool having more than one antenna. A uniform test pack, a layered test pack, and an effective media test pack are each disposed in the tool. A signal is induced in a receiver antenna in the tool when a second antenna is energized with a known current of a known frequency. The induced signal is measured and a calibration gain and offset is determined. A corrected signal is produced and compared with the determined signal based on a forward model.

Other aspects and advantages of the claimed subject matter will be apparent from the following description and the appended claims.

DETAILED DESCRIPTION

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nonetheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Petrophysically-consistent techniques for calibrating full-tensor complex conductivity tools are disclosed. These techniques involve measurement of induced voltage in a receiver antenna due to eddy currents induced in an intermediate coupling medium (ICM) as result of an energized transmitter coil. The electrical properties of the ICM have a petrophysical origin and determine the voltage induced in each of the receiver coils due to a known current in a transmitter coil. Calibration gain and offset values, which can be represented as magnitude and phase respectively, for each of the transmitter-receiver coil couplings, are obtained by comparing measured signals to calculated signals. This method is related to the design of ICM with adjustable petrophysical properties that produce desired couplings effects of each of the transmitter-receiver couplings, thereby ensuring petrophysically-consistent calibration of EM core analysis tool for measuring directional electrical properties.

The disclosed calibration methods can be applied to an EM core analysis tool that has plurality of antennas with at least one antenna having its axis at an angle with respect to the axis of the tool. The disclosed method is capable of calibrating all elements in a trans-impedance matrix that defines various couplings between transmitter and receiver antennas in a TMD EM core analysis tool. Tilted test loop (TTL), uniform test pack (UTP), layered test pack (LTP), and effective media test pack (EMTP) are disclosed as the calibration mediums or the ICM. Petrophysically-consistent calibrations are performed by using test packs instead of test loops. Embodiments are applicable to both master calibration and field calibration. Embodiments are not limited to how the TTL and the test packs are constructed, and are not restricted to any particular transmitter-receiver configuration.

Intermediate Coupling Media (ICM)

Figure 1:
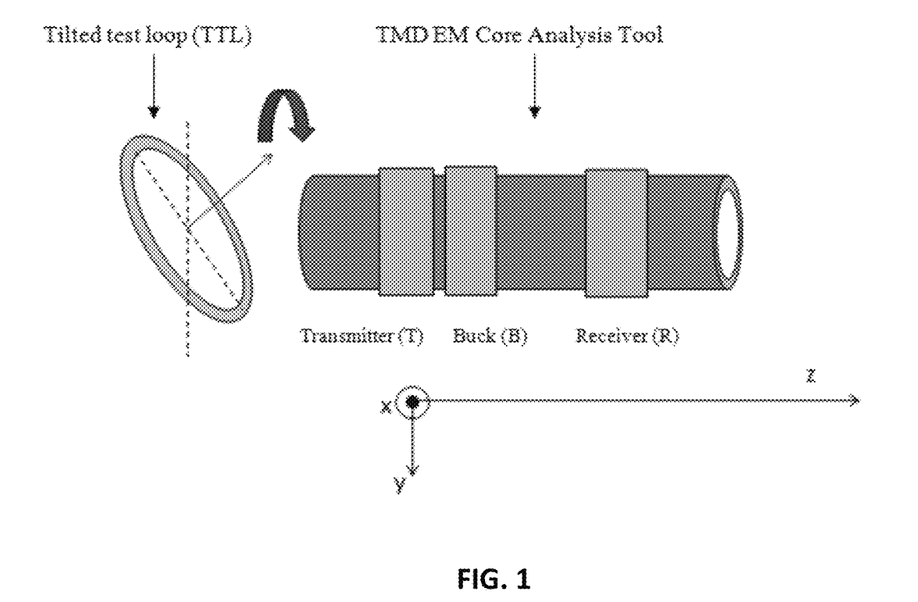
FIG. 1 is an illustration of a disclosed embodiment of a TTL that can be used to calibrate nine transmitter-receiver couplings of a TDM EM Core Analysis Tool.
Figure 5:
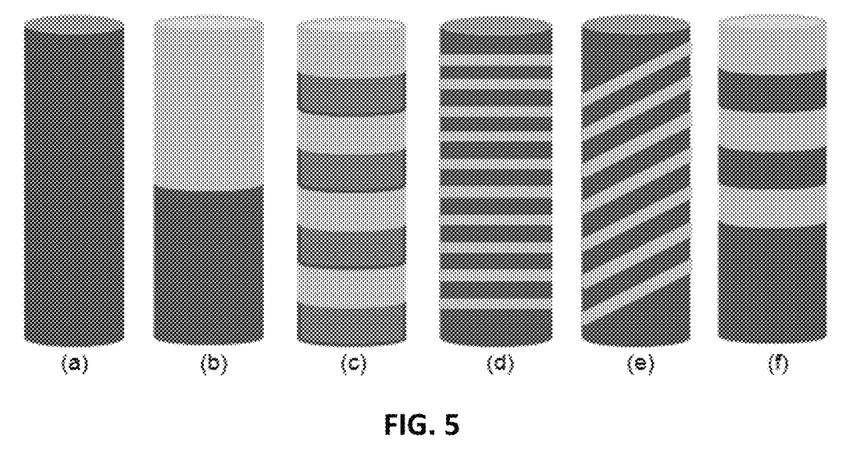
FIG. 5 is An illustration of test packs that can be used to calibrate a TDM EM Core Analysis Tool.
  (a) Uniform test pack (UTP),
  (b) Double-layer test pack (DTP),
  (c) Multi-layer test pack (MTP),
  (d) Fine multi-layer test pack (FMTP),
  (e) Fine multi-layer dipping test pack (FMDTP),
  (f) Uniform-layered-interface test pack (ULITP).
Figure 6:
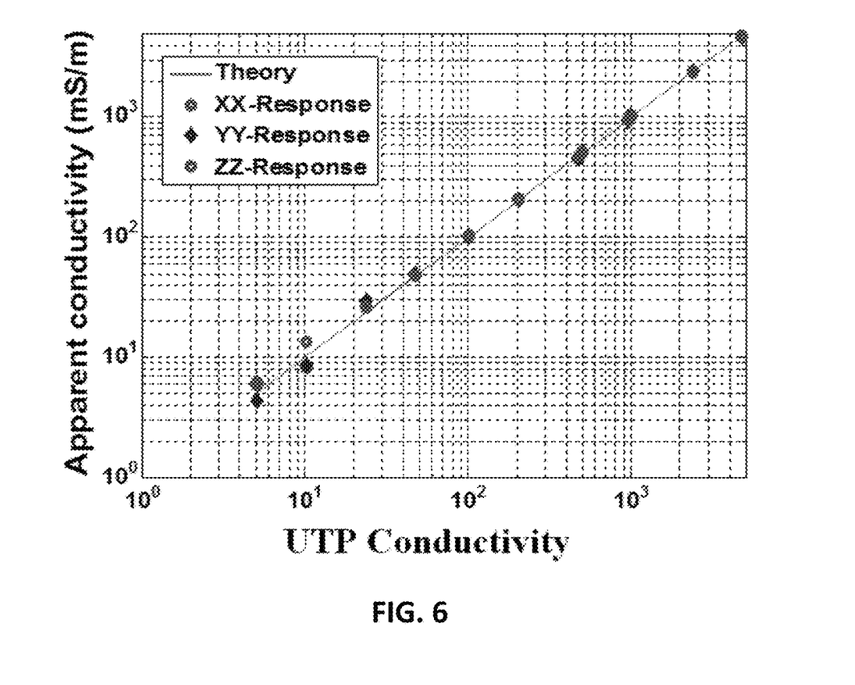
FIG. 6 is a comparison of modeled and measured results after calibration with a UTP showing the coupling effects of UTP on three direct couplings versus UTP conductivity.
Figure 7:
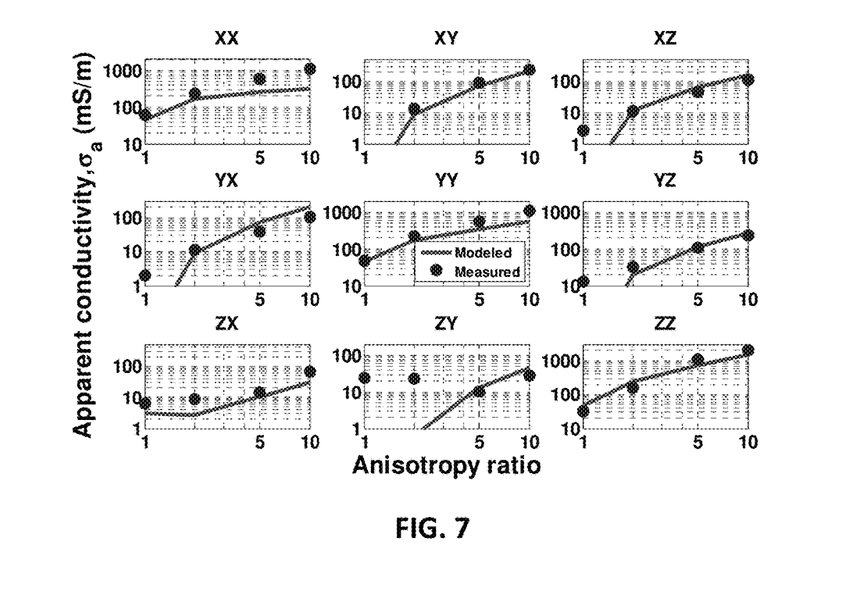
FIG. 7 is a comparison of modeled and measured results after calibration with FMDTP showing coupling effects of 45-degree dipping, 60-degree azimuthal FMDTP on nine couplings at different FMDTP anisotropy ratios.
Figure 8:
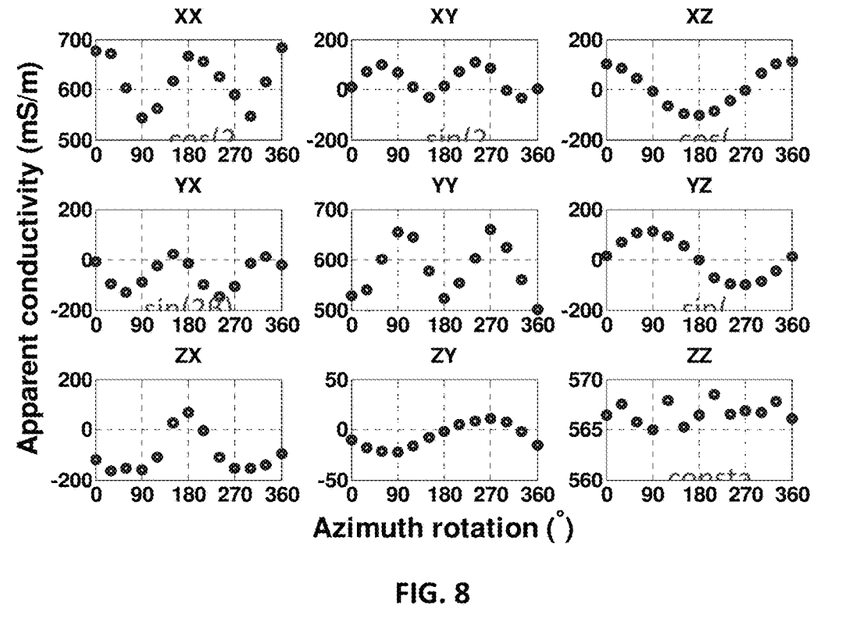
FIG. 8 is a comparison of modeled and measured results after calibration with FMDTP showing coupling effects of 45-degree dipping FMDTP on nine couplings at different azimuths of FMDTP with respect to TMD EM core analysis tool.
Figure 9:
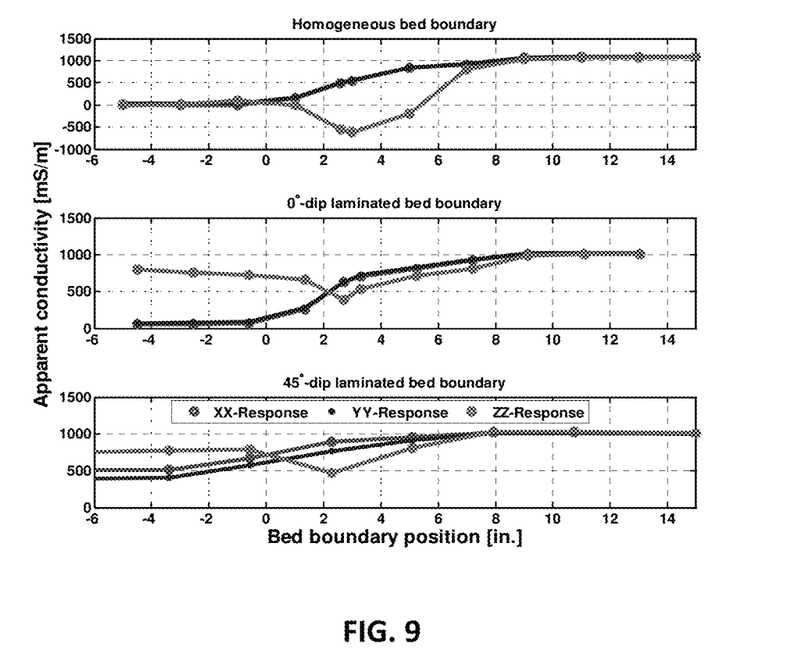
FIG. 9 is a plot showing coupling effects of DTP (top), MTP (middle), and ULITP (bottom) on three direct couplings versus different distances of the significant interface of the test pack from the center of transmitter coils.
Figure 10:
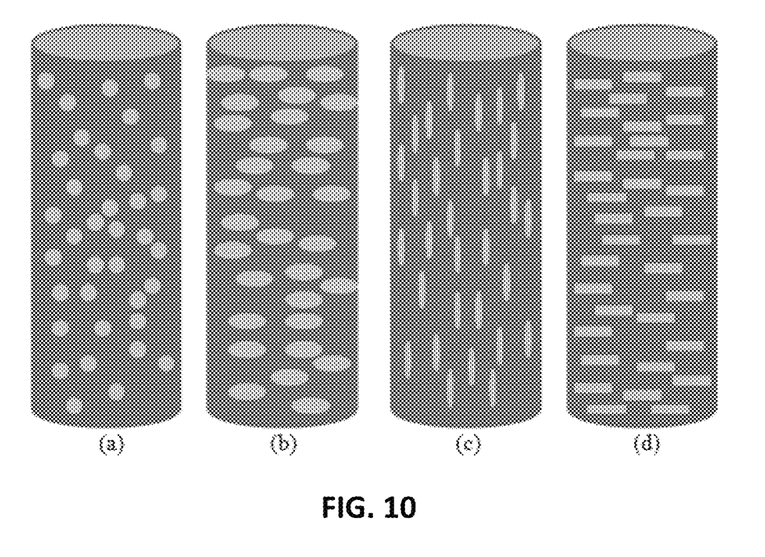
FIG. 10 is an illustration of EMT-based test packs that can be used to calibrate TDM EM Core Analysis Tool:
(a) Spheroid test pack (STP),
(b) Ellipsoid test pack (ETP),
(c) Needle test pack (NTP), and
(d) Flat-disc test pack (FTP).

In one embodiment, the EM coupling takes place during the calibration process due to the interaction of EM energy emitted by transmitter coil with the ICM. Presence of ICM produces coupling effects on the receiver antennas when the transmitter antennas are energized. Petrophysical properties, electrical properties, dimensions, and design of the ICM are components of a successful calibration process. When a transmitter is energized, it emits EM energy into the surrounding. The emitted energy induces a primary voltage in the receiver coils and also induces eddy currents in the ICM. The eddy current in the ICM produces a secondary EM field that induces a secondary voltage in the receiver coil. The measured secondary voltage is compared with the calculated induced voltage based on a forward model of the coupling effects of the ICM. The disclosed methods include four types of intermediate coupling media, namely TTL, UTP, LTP, and EMTP, as shown in FIGS. 1, 5, and 10. The disclosed ICM are designed such that its directional impedances are known, therefore the coupling effects of an ICM can be modeled using any suitable analytic code algorithm or three-dimensional EM modeling formulations. For example, a COMSOL AC/DC module may be used for forward modeling for calibration purposes.

Tilted Test Loop (TTL) Calibration

Figure 2:
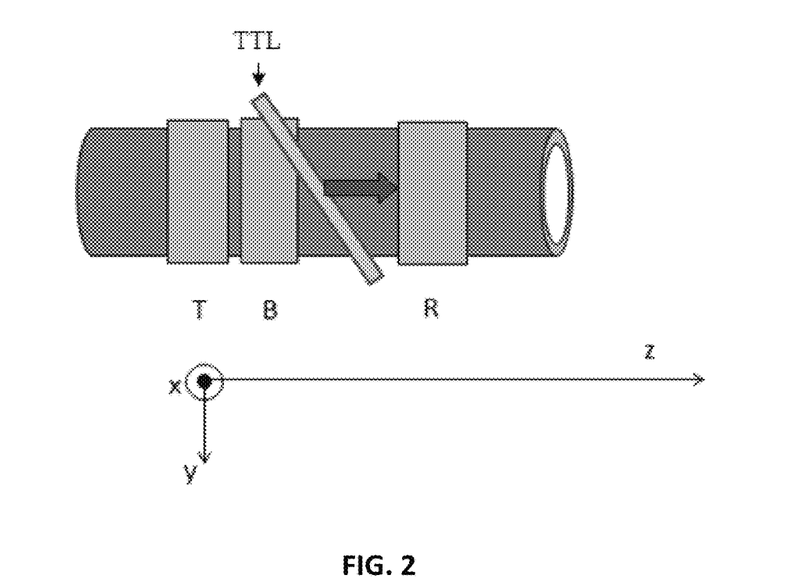
FIG. 2 is a Longitudinal view of a disclosed embodiment of a TTL translating along the length (+Z-axis) of TDM EM Core Analysis Tool for calibration purposes.
Figure 3:
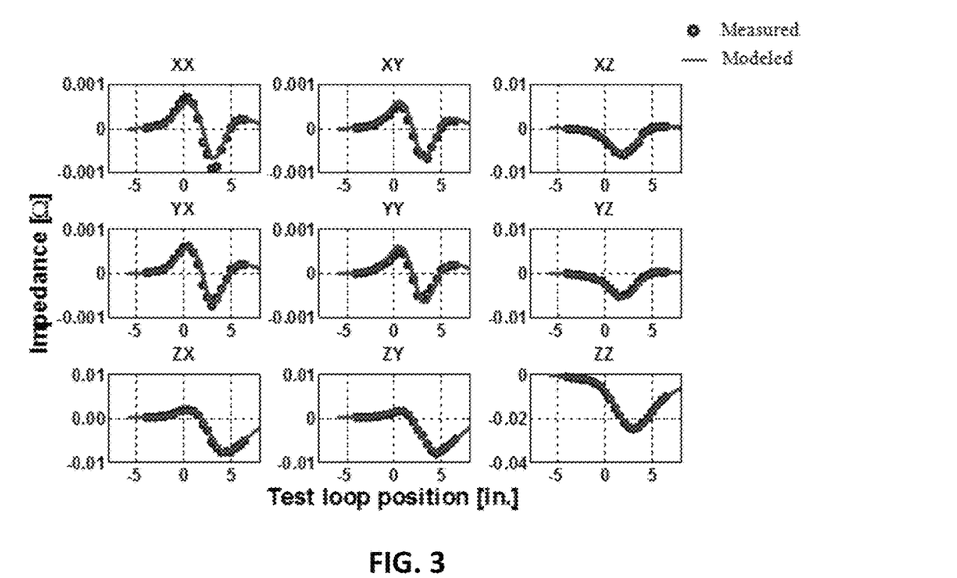
FIG. 3 is a comparison of modeled and measured results after calibration with a TTL as described herein showing coupling effects of TTL on nine couplings versus distance between center of TTL and the center of transmitter coil.
Figure 4:
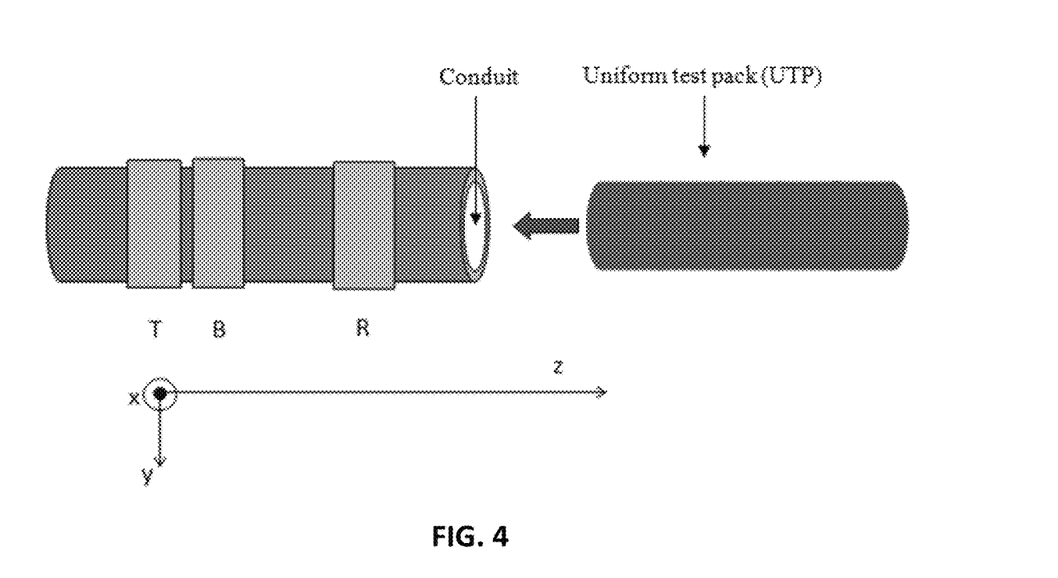
FIG. 4 is an illustration of a UTP that can be pushed into the conduit of a TDM EM Core Analysis Tool to calibrate three direct transmitter-receiver couplings (XX,YY,ZZ).

In this calibration method, a rigid conductive loop, also referred to as the TTL, that allows eddy current build up when exposed to an energized transmitter antenna is disclosed. Referring to FIG. 2, the TTL lies in a plane that intercepts YZ-plane of the EM core analysis tool at an angle that defines the dip of the TTL with respect to the receiver coil. Also, the magnetic moment of the TTL is directed at a non-zero angle from ZX plane, which defines the azimuth of TTL with respect to the receiver coil. Dip, azimuth, and location of the TTL can be adjusted to provide optimum coupling for each of the transmitter-receiver couplings, for instance optimum dip angle for an orthogonal triaxial EM tool is 45 degrees. Size, shape, and axis of TTL depend on the antenna design and separation of the antennas. As already mentioned, TTL for a triaxial orthogonal EM tool is an elliptical test loop of known impedance. TTL is placed in an elliptical groove on a non-conductive hollow cylindrical support. FIG. 3 shows a comparison of measured and modeled induced response of an EM core analysis tool after calibrating with a TTL. Modeled results are in agreement with measured values at various distances of center of TTL to center of transmitter coils, which indicates that the TTL calibration has corrected the measured value for all the positions on the z-axis within the tool resolution defined by the coil configuration, operating frequency, and the tool electronics.

Uniform and Layered Test Pack (UTP & LTP) Calibration

Test packs are porous rigid cylindrical structures, which can be filled with fluids. Test packs allow variation in porosity, fluid saturations, conductivity of matrix and fluids, grain textures, and pore structures in order to obtain desired directional electrical properties and magnetic moments. Such test packs ensure petrophysically consistent calibration. Test packs can be designed to be heterogeneous, homogeneous, isotropic, or anisotropic in its electrical behavior. A uniform test pack (UTP) has homogenous and isotropic distribution of matrix as well as fluid type with homogeneous grain shape, size, and texture. For example, UTP may be a uniform mixture of different sizes of non-conductive glass beads and filled with fluids, so as to have uniform fluid saturation and conductivity. A UTP may be a uniform solid cylinder made of cemented conductive/dispersive grains, for e.g. TIVAR, without presence of any fluids. A UTP generates coupling effects on three direct transmitter-receiver couplings. On the other hand, a layered test pack (LTP) has thin petrophysical layers of different directional electrical properties, which gives electrically anisotropic properties to the LTP. A LTP can be made by creating layers of different sizes of glass beads, layers of different fluid or matrix conductivity, or layer of alternating fluid and solid phase. The layers in LTP can be of varying thickness, dips, and azimuth. A LTP with only dipping layers and no relative azimuth generates coupling effects on five diagonal transmitter-receiver couplings. A LTP with dipping layers and a non-zero relative azimuth produces coupling effects on each of nine transmitter-receiver coupling. In this calibration method, test packs are placed and centered inside the conduit of an EM core analysis tool. Dip and azimuth of the test pack determines the magnetic moment. Therefore dip, azimuth, and location of the test pack can be varied to obtain optimum coupling for each of the transmitter-receiver coupling. FIGS. 6, 7, 8, and 9 show a comparison of measured and modeled induced response of an EM core analysis tool after calibrating with test packs. In these figures, modeled results are in agreement with measured values at various salinities, anisotropy ratios, azimuths, and distances, respectively, which indicates that the test pack calibration has corrected the measured values.

Effective Media Test Pack (EMTP) Calibration

Figure 11:
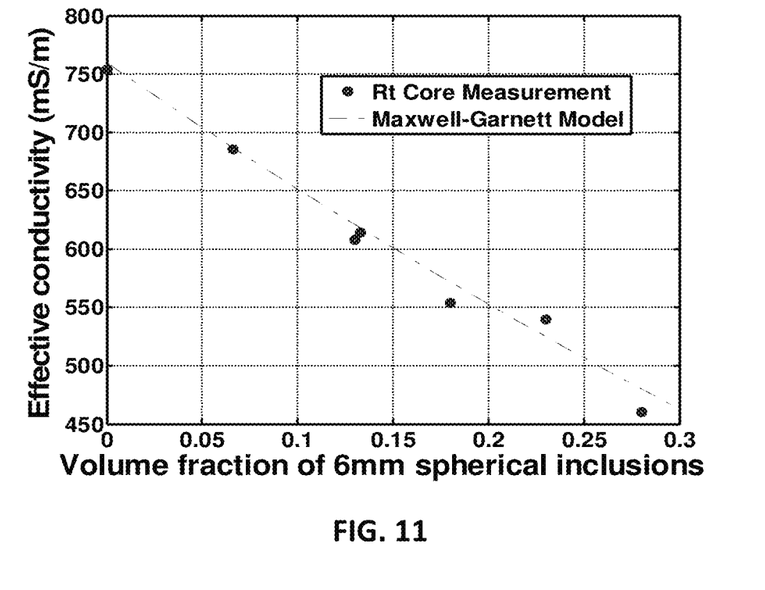
FIG. 11 is a plot showing coupling effects of STP on three direct couplings versus different volume fraction of spherical inclusions in the STP.

An effective media test pack (EMTP) is a test pack that is a heterogeneous mixture of two or more dielectric materials. Such test packs, tough heterogeneous in their constituents, are homogenous from the point of view of EM fields at kHz range for analog-geological materials of low conductivity and dispersivity. Effective electrical properties of EMTP are calculated using mixing principles, effective medium theories, empirical mixing equations, or EM modeling softwares. EMTP can be isotropic or anisotropic, and produce coupling effects on nine transmitter-receiver couplings. The process involved in this calibration method is similar to UTP & LTP calibration method. EMTP leads to petrophysically consistent calibration for evaluating electrical properties of heterogeneous geological samples. FIG. 10 indicates some of the EMTP test packs that can be used for calibration purposes. FTP, NTP, and ETP produce coupling effects of an electrically anisotropic test pack on the transmitter-receiver couplings. FIG. 11 shows a comparison of measured and modeled induced response of EM core analysis tool after calibrating with EMTP. Modeled results are in good agreement with measured values at various volume fractions of spherical inclusions, which indicates that the test pack calibration has corrected the measured values. Shapes, dielectric properties, and type of inclusions can be varied to achieve optimum transmitter-receiver coupling.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A method for calibrating an electromagnetic core analysis tool comprising:
   providing the electromagnetic core analysis tool, the tool including a buck coil deployed axially between a transmitter and a receiver on a tool body, the tool body configured for receiving a formation core, the transmitter and receiver configured to provide full tensor couplings;
   deploying a layered test pack in the tool body, the layered test pack including a plurality of alternating layers of different materials;
   measuring a voltage signal induced in the receiver when the transmitter is energized with a known current of a known frequency after deployment of the layered test pack in the tool body;
   comparing the induced signal with corresponding computed signals obtained using a model to calibrate the core analysis tool by determining a calibration gain and offset for the induced signal;
   and
   using said calibrated core analysis tool to make a full tensor dielectric and conductivity measurement of a geological core sample.

2. The method of claim 1, wherein the layered test pack comprises at least four of the alternating layers.

3. The method of claim 1, wherein the layered test pack comprises at least seven of the alternating layers.

4. The method of claim 1, wherein the alternating layers are tilted with respect to a longitudinal axis of the test pack.

5. The method of claim 1, wherein the layered test pack is fabricated using layers of different sizes of glass beads, layers of different fluid or matrix conductivity, or layers of alternating fluid and solid phase.

6. The method of claim 1, wherein the layered test pack is electrically anisotropic.

7. The method of claim 1, wherein the full tensor dielectric and conductivity measurement of the geological core sample is further processed to estimate directional resistivities, anisotropy ratios, fluid saturations, bed boundaries, and/or dips of the geological core sample.

8. A method for calibrating an electromagnetic core analysis tool comprising:
   providing the electromagnetic core analysis tool, the tool including a buck coil deployed axially between a transmitter and a receiver on a tool body, the tool body configured for receiving a formation core, the transmitter and receiver configured to provide full tensor couplings;
   deploying an effective media test pack in the tool body, the effective media test pack including a heterogeneous mixture of two or more dielectric materials;
   measuring a voltage signal induced in the receiver when the transmitter is energized with a known current of a known frequency after deployment of the effective media test pack in the tool body;
   comparing the induced signal with corresponding computed signals obtained using a model to calibrate the core analysis tool by determining a calibration gain and offset for the induced signal;
   and
   using said calibrated core analysis tool to make a full tensor dielectric and conductivity measurement of a geological core sample.

9. The method of claim 8, wherein the effective media test pack comprises spheroid particles in a matrix.

10. The method of claim 8, wherein the effective media test pack comprises ellipsoid particles in a matrix.

11. The method of claim 8, wherein the effective media test pack comprises needle particles in a matrix.

12. The method of claim 8, wherein the effective media test pack comprises flat disc particles in a matrix.

13. The method of claim 8, wherein the full tensor dielectric and conductivity measurement of the geological core sample is further processed to estimate directional resistivities, anisotropy ratios, fluid saturations, bed boundaries, and/or dips of the geological core sample.

* * * * *